Figure 1:
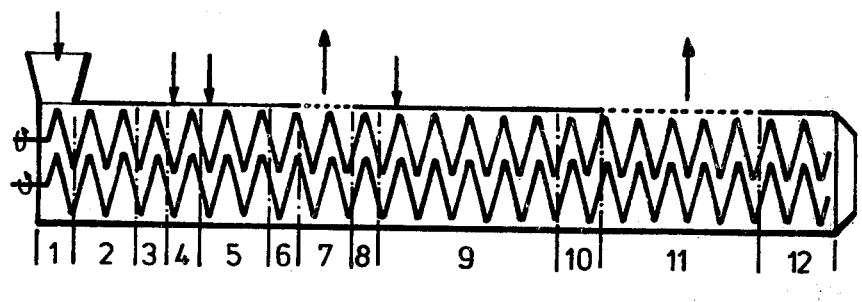

United States Patent [19]

Korber

[11] 4,206,155

[45] Jun. 3, 1980

[54] PRODUCTION OF GRAFT POLYMERS

[75] Inventor: Helmut Korber, Odenthal, Fed. Rep. of Germany

[73] Assignee: Bayer Aktiengesellschaft, Fed. Rep. of Germany

[21] Appl. No.: 881,194

[22] Filed: Feb. 27, 1978

[30] Foreign Application Priority Data

Jul. 28, 1977 [DE] Fed. Rep. of Germany ....... 2734105

[51] Int. Cl.$^2$ ............................................. C08F 255/02
[52] U.S. Cl. ................................... 525/301; 525/302; 525/383; 525/263
[58] Field of Search ............... 260/878 R, 879, 880 R, 260/873, 874, 859 R, 886, 881, 885

[56] References Cited

U.S. PATENT DOCUMENTS

| | | | |
|---|---|---|---|
| 3,832,423 | 8/1974 | Milkovich et al. | 260/878 R |
| 3,849,516 | 11/1974 | Plank | 260/878 R |
| 3,862,265 | 1/1975 | Steinkamp et al. | 260/878 R |

*Primary Examiner*—Paul R. Michl
*Attorney, Agent, or Firm*—Connolly and Hutz

[57] ABSTRACT

A continuous process for the production of graft polymers of oxidizable polymers as backbone and radically polymerizable monomers for forming the side chains, characterized in that an intensively stirred melt of the backbone polymer is brought into contact for at most 10 minutes with oxygen or oxygen-containing gases under a pressure of from 1 to 150 bars and at a temperature of from 100° to 300° C., immediately after which one or more radically polymerizable monomers is/are added with intensive stirring in the absence of oxygen and oxygen-containing gas, and after their polymerization the graft polymer formed is isolated.

2 Claims, 1 Drawing Figure

PRODUCTION OF GRAFT POLYMERS

This invention relates to a special method for polymerising radically polymerisable monomers in the presence of a polymer, chemical bonds being formed between the polymerised monomers and the polymer. Shaped structures of the type in question are referred to hereinafter as graft polymers. Graft polymers and methods for their production are basically known. For example, British patent specification No. 951,128 describes a process in which a plasticised polymer is degraded by mechanical treatment in the presence of oxygen, subsequently dissolved in a suitable monomer and the mixture polymerised. This process is extremely laborious and always involves degradation of the backbone polymer, with the result that the outcome of the polymerisation reaction is difficult to predict and control.

The present invention provides a continuous process for the production of graft polymers of oxidisable polymers as backbone and radically polymerisable monomers for forming the side chains, characterised in that an intensively stirred melt of the backbone polymer is brought into contact for at most 10 minutes with oxygen or oxygen-containing gases under a pressure of from 1 to 150 bars and at a temperature of from 80° to 300° C., immediately after which one or more radically polymerisable monomers is/are added with intensive stirring in the absence of oxygen and oxygen-containing gas, the residual monomers are removed on completion of polymerisation and the graft polymer formed is isolated.

The present invention also provides an apparatus for carrying out this process which is essentially formed by a single-screw or multi-screw extruder having the following working zones:
1. feed zone
2. melting zone
3. compression zone
4. induction zone with inlet for gases under pressure
5. oxidation zone with inlet for gases under pressure
6. second compression zone
7. venting zone
8. third compression zone
9. polymerisation zone with monomer inlet
10. fourth compression zone
11. evaporation zone
12. extrusion zone.

The apparatus is diagrammatically illustrated in FIG. 1.

The process according to the invention is essentially based on the extremely rapid introduction of the peroxide groups into the base polymer under moderate reaction conditions. The material has to be only briefly exposed to relatively high pressures and temperatures. Degradation of the material with shortening of the chains and reduction of the molecular weight is avoided. At the same time, the catalyst required for the immediately following radical polymerisation of the monomers is directly produced on the backbone polymer and is bound to it.

The quantity of catalyst introduced in this way amounts of between about 1000 and 10,000 ppm of active oxygen. The actived sites are uniformly distributed over the polymer. Accordingly, in contrast to conventional graft polymerisation processes, numerous active sites are available with the result that numerous relatively short side chains are formed in the subsequent graft polymerisation reaction.

Accordingly, the advantages of the process lie in the substantially continuous, rapid and reproducible production of the graft polymer without degradation of the base polymer, and in a graft polymer containing numerous short uniformly distributed side chains.

The known graft polymers produced by transferring radicals to the backbone polymer conytain from 1 to 2 graft sites per macromolecule. The molecular weights Mw of the side chains are generally between 300,000 and 1,000,000.

The graft polymers produced in accordance with the invention contain from 10 to 50 graft sites per macromolecule, and the average molecular weights of the graft branches amount to between 5,000 and 40,000.

This molecular structure, which is favourable for numerous applications, explains the excellent homogeneity and compatibility of the graft polymers produced according to the invention. They may be used for modifying polymers and as compatibility promoters in compounds. The pure graft polymers are used for injection moulding and coating purposes because it is possible, by grafting, to adjust certain properties without the mechanical properties being adversely affected by poor compatibility, as in the case of known graft products.

Numerous monomer/base polymer combinations obtainable by the process according to the invention, for example grafting acrylic acid or butadiene onto polyethylene, cannot be obtained by conventional processes.

Basically, any oxidisable polymers are suitable for use as backbone polymers in the process according to the invention. It is particularly preferred to use polymers and copolymers of monoolefins, such as polyethylene, ethylene/vinyl acetate copolymers, polypropylene, polystyrene, or ethylene/propylene rubbers. It is also possible to use diene polymers, such as polybutadiene, polyisoprene, styrene/butadiene copolymers, and polyesters such as polyethylene terephthalate and polybutylene terephthalate. Polyethers, polyols, polyurethanes, polyphenylene oxide and polyacetals, such as polyoxymethylene, may also be used.

Suitable radically polymerisable monomers are, in principle, any radically polymerisable monomer compounds, but preferably the following groups:
1. styrene, nucleus-alkylated or side-chain-alkylated styren
2. acrylonitrile, methacrylonitrile and mixtures thereof;
3. acrylic acid or methacrylic acid and their esters containing from 1 to 8 carbon atoms in the alcohol radical;
4. maleic acid anhydride and maleic acid esters containing from 1 to 8 carbon atoms in the alcohol radical;
5. isoprene, butadiene and mixtures thereof; and
6. olefins containing from 2 to 8 carbon atoms, combinations of monomers belonging to groups 1 to 6 also being suitable.

The monomers are generally used in quantities of from 0,5 to 50% by weight and preferably in quantities of from 5 to 20% by weight, based on the polymer.

Oxygen or any oxygen-containing gas may be used for oxidation, air being preferred.

In general, the process may be carried out by melting and compressing the backbone polymer in a screw extruder. After the compression zone, oxygen or oxygen-containing gas is introduced in excess into the induction zone at 190° to 300° C. under a pressure of from 1 to 150 bars. Oxidation is started in the induction zone and completed at 100° C. to 300° C. in the following oxidation zone. In this case, too, oxygen or an oxygen-containing gas is introduced in excess into the screw extruder under a pressure of from 1 to 150 bars. The oxidation zone is followed by a compression zone for maintaining pressure and then by a venting zone from which the gases escape. The venting zone is followed by another compression zone which prevents the monomer introduced in the following polymerisation zone under a pressure of from 1 to 50 bars from entering the waste gases. In the polymerisation zone, the monomer or monomer mixture is polymerised at 100° to 300° C. with the peroxides formed in the oxidation zone as initiator until a conversion of from 50 to 99% has been obtained. The polymerisation zone is followed by another compression zone for maintaining pressure against the following evaporation zone which is under a vacuum of 1 to 100 mbar. The residual monomers are removed in the evaporation zone and the graft product is subsequently extruded and granulated.

EXAMPLE 1

The grafting of acrylic acid and butyl acrylate onto high pressure polyethylene (Baylon (Trade Mark) 19 N 430, a product of Bayer AG) is carried out in a contra-rotating twin-screw laboratory extruder of the Point Eight Type manufactured by Weldin Inc, with a screw diameter of 20 mm and a length of 48 D. Compression of the melt was obtained by enlarging the core diameter of the screws in the compression zones. The throughput amounted to 750 g per hour for a screw speed of 50 rpm. The average residence time of the product in the extruder was 10 minutes. The screws were provided with a continuous pitch of 1 D.

80 Liters/h of air were introduced into the induction zone under a pressure of 60 bars and 240 liters/h of air were introduced into the oxidation zone under a pressure of 40 bars. 150 g/h of a mixture of 10 parts of acrylic acid and 90 parts of butyl acrylate were introduced into the polymerisation zone under a pressure of 5 bars. The conversion amounted to 53%. The graft product contained 1.5% of acrylic acid and 9% of butyl acrylate. After leaving the oxidation zone, the melt contained 1000 ppm of active oxygen. At 7 g/10 mins, the melt index according to condition E at 190° C. was unchanged in relation to the starting product. The lengths and temperatures of the zones of the extruder are shown in Table 1.

Table 1

| Zone | Example 1 Length | Example 1 Temp. °C. | Example 2 Length | Example 2 Temp. °C. |
|---|---|---|---|---|
| Feed | 2 D | 110 | 2 D | 60 |
| Melting | 5 D | 180 | 4 D | 120 |
| Compression | 2 D | 180 | 1 D | 120 |
| Induction | 5 D | 215 | 2 D | 210 |
| Oxidation | 6 D | 170 | 5 D | 180 |
| Compression | 2 D | 170 | 1 D | 120 |
| Venting | 4 D | 170 | 2 D | 100 |
| Compression | 2 D | 170 | 1 D | 120 |
| Polymerisation | 8 D | 190 | 10 D | 160 |
| Compression | 2 D | 190 | 1 D | 160 |
| Evaporation | 7 D | 190 | 6 D | 190 |
| Extrusion | 5 D | 190 | 5 D | 200 |
| | 48 D | | 58 D | |

EXAMPLE 2

The grafting of styrene and acrylonitrile onto Levapren 450 (ethylene/vinylacetate copolymer having 45±1.5% vinylacetate content) is carried out in a twin screw extruder with the screws rotating in the same direction. The self-cleaning variable screws had a diameter of 32 mm and a length of 38 D. The melt is compressed by left-hand thread, sudden decreases in pitch and kneading blades directed to the left in the double-flighted variable screw. The throughput amounted to 2500 g/h for a screw speed of 25 rpm. 100 l/h of air were introduced into the induction zone under a pressure of 30 bars and 300 l/h of air were introduced into the oxidation zone under a pressure of 20 bars. 250 g/h of a mixture of 28 parts of acrylonitrile and 72 parts of styrene were introduced into the polymerisation zone under a pressure of 2 bars. The conversion amounted to 64%. The graft product contained 1.8% of acrylonitrile and 4.6% of styrene. After the oxidation zone, the melt contained 2500 ppm of active oxygen. The Mooney value amounted to 13.

The lengths and temperatures of the zones of the extruder are shown in Table. 1.

I claim:

1. A continuous process for the production of a graft polymer having an oxidisable polymer as backbone and at least one radically polymerisable monomer for forming the side chains, which comprises bringing an intensively stirred melt of the backbone polymer into contact for at most 10 minutes with oxygen or an oxygen-containing gas under a pressure of from 1 to 150 bars and at a temperature of from 100° to 300° C., immediately thereafter adding at least one radically polymerisable monomer with intensive stirring in the absence of oxygen and oxygen-containing gas, and after graft polymerisation isolating the graft polymer formed.

2. A process as claimed in claim 1, wherein the at least one monomer is added in a quantity of from 0,5 to 50% by weight, based on the weight of the polymer.

* * * * *